June 8, 1954    M. D. CHAPMAN    2,680,390
CUTTING TOOL ASSEMBLY
Filed Jan. 27, 1953    2 Sheets-Sheet 1

INVENTOR.
BY MERVIL D. CHAPMAN
ATTORNEY

June 8, 1954  M. D. CHAPMAN  2,680,390
CUTTING TOOL ASSEMBLY
Filed Jan. 27, 1953  2 Sheets-Sheet 2
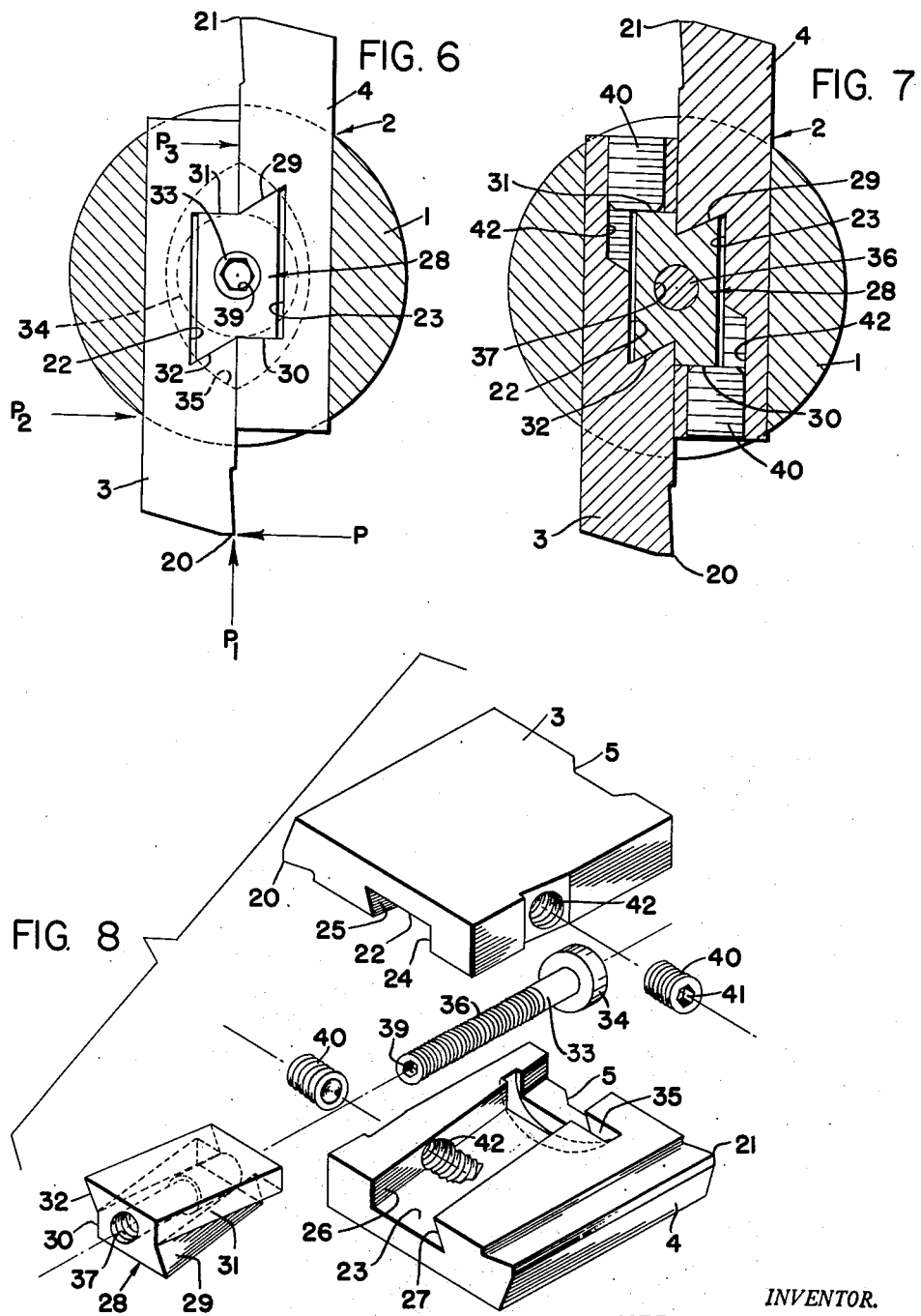
INVENTOR.
MERVIL D. CHAPMAN
BY
ATTORNEY Patented June 8, 1954

2,680,390

UNITED STATES PATENT OFFICE 2,680,390

CUTTING TOOL ASSEMBLY

Mervil D. Chapman, Willoughby, Ohio

Application January 27, 1953, Serial No. 333,459

6 Claims. (Cl. 77—58)

This invention relates in general to cutting tools and more particularly to metal cutting tools, such as reamers, boring tools, or the like, of the kind in which an assembly of two blades, with their cutting edges in diametrically opposed relation, is free to move within predetermined limits in the direction parallel to the common plane of the edges and perpendicular to the axis of the reamer or boring bar for holding the blades, and in which the cutting edges of the blades are externally adjustable radially inwardly or outwardly as desired for various sizes of the bores in the work.

The conventional practice is to provide a reamer bar with a transverse slot near its forward end to receive two diametrically oppositely extending cutters. It is also conventional practice to provide the reamer bar with an axial bore back of the transverse slot to receive a centering pin so as to positively center the blade assembly with no float or approximately center the blade assembly, while permitting a restricted amount of float of the cutting blade assembly during its cutting operation on the work. Conventional practice provides positive adjustment of blades radially outwardly only.

It will be appreciated that means must be provided for adjustment of the overall outside diameter of the cutting edges of the two blades for operation in various size bores of the work. In addition, after such radial adjustments have been made, it is necessary to provide additional means for locking the two blades against relative movement after such adjustment. The conventional practice in these adjusting and locking operations renders it necessary to make the radial adjustment and effect their locking against radial displacement while the two blades are removed from the transverse slot in the bar, after which the two blades are inserted in the transverse slot and positioned by the centering pin located at the axial bore in the bar behind the transverse slot. Inasmuch as such blade adjustment must be frequently made, this procedure at its best is time consuming.

It is therefore one of the primary objects of my invention to provide means whereby the uniform diametrical adjustment of the two blades may be externally made and also the two blades externally locked against relative movement in any desired diametrical adjustment, both while the two blades and wedge are fully assembled and in position within the transverse slot of the reamer bar and while there positioned by the centering pin.

Another object is to provide such a diametrical adjustment means and blade locking means that are both readily externally accessible for such adjusting and locking operations.

Another object is to provide such a diametrical blade adjusting means that is not only externally accessible but which is at all times positive in its action when used to increase or decrease the overall outside diameter of the cutting edges of the two blades.

Another object is to provide, as a means for diametrical blade adjustment, a two direction radially double acting wedge member with axially oppositely extending ramps to engage correspondingly oppositely extending grooves in the inner surfaces of the two blades, which blades and double acting wedge member may be inserted in and removed from the transverse slot in the boring or reamer bar as a unit.

A further object is to provide a simple, externally accessible member rotatable in either direction to cause axial movement of the wedge member to positively expand or contract the blades uniformly radially and to provide externally accessible means for locking each of the blades against relative movement with each other and the wedge member.

A further object is to provide a floating mount for the wedge and blade assembly whereby the float is controlled, inasmuch as resilient means are employed for returning the blades to center when the blade assembly is out of the work so as to provide a borer or reamer that will operate equally as well on all types of machine tools namely those where the cutting tools themselves rotate, as well as where the cutting tools are non-rotating and the work is rotated.

With the foregoing and other objects in view, the invention resides in the combination of parts and in the details of construction hereinafter set forth in the following specification and appended claims, certain embodiments thereof being illustrated in the accompanying drawings, in which:

Figure 6 is a view taken in cross-section along line 6—6 of Figure 4;

Figure 7 is a view in cross-section taken along line 7—7 of Figure 5; and

Figure 8 is an exploded view in perspective of the blade assembly and its adjusting wedge and the means for adjusting and locking the wedge.

Figure 1:
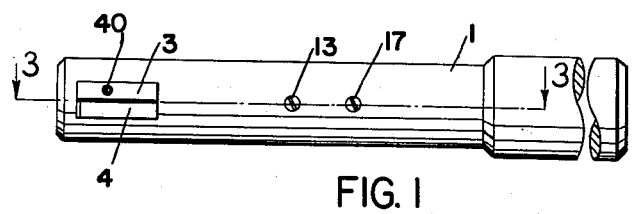
Figure 1 is a view in side elevation of a reamer bar with the cutting blades secured therein.
Figure 2:
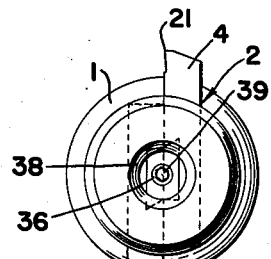
Figure 2 is a view in front elevation of the reamer bar and the cutting blades secured therein.
Figure 3:
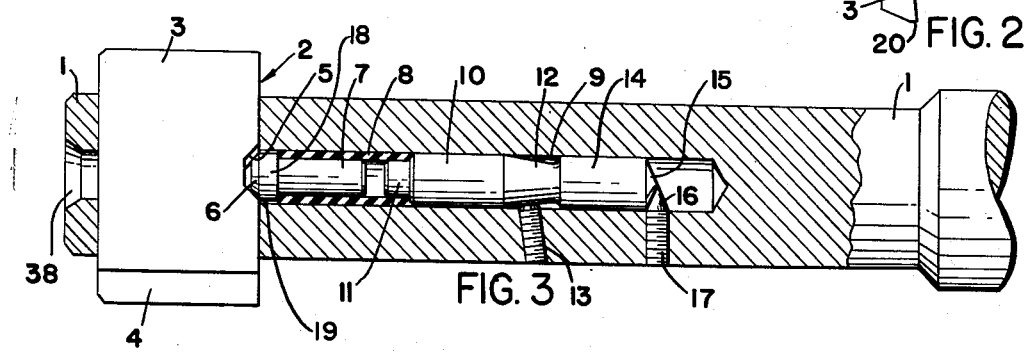
Figure 3 is a view partly in side elevation and partly in longitudinal section taken along line 3—3 of Figure 1, showing the cutting blade assembly assembled in the bar and positioned by the centering pin and the pressure pin locked in position behind the centering pin.

Referring more particularly to the drawings, I have shown in Figure 1 a bar 1, which may be a reamer bar, or the like provided with the usual transverse slot for holding a blade assembly, generally referred to at 2, and preferably including two diametrically opposed cutters 3 and 4.

The two blades are formed with a co-extensive centering notch 5 to receive the forward bevelled head 6 of a centering pin 18 having a shank 7 of lesser diameter to receive a rubber bushing 8 that surrounds the shank 7 within the usual axial bore 9 in the reamer bar 1. Centering pin 18 has its major diameter 19 less than the bore 9 to allow for tilt of the centering pin. Behind the centering pin 7 and within the bore 9, I arrange a pressure pin 10 having a forward shank 11, of lesser outside diameter, to fit inside of the rubber bushing 8 and in axially spaced relation with shank 7 of the centering pin. The middle portion of pressure pin 10 is tapered at 12 to receive the inner end of an angularly disposed locking set screw 13 so that tightening of this set screw locks the position of the pressure pin 10 and its adjustment to the centering pin. The pressure pin 10 also has a rear cylindrical section 14 provided with a conical end 15 against which bears the inner conical tip 16 of another set screw 17, so that movement of set screw 17 adjusts the position of pressure pin 10 in relation to the centering pin.

In Figure 8, I have illustrated the various component parts that go to make up the blade assembly which I have generally designated at 2 in the remaining figures, including the two blades 3 and 4 themselves. Blade 3 has a cutting edge 20 and blade 4 has a diametrically opposed cutting edge 21. Blade 3 is provided with an axial slot 22 in its inner surface and blade 4 has an axial slot 23 cut in its opposed inner surface. These two slots 22 and 23 are inclined in opposite direction longitudinally. Slot 22 is formed with a straight side wall 24 and an undercut inclined side wall 25. Correspondingly, slot 23 is formed with a straight side wall 26 with an undercut inclined side wall 27. At 28 I have generally indicated a blade adjusting wedge. As indicated in Figure 8, this wedge is provided with a side tongue 29 that is so formed to slidably engage the under cut side wall 27 of blade 4 and a straight side wall 30 to slidably engage the straight side wall 26 of the slot 23 of blade 4. This constitutes the lower half of the wedge member 28 as viewed in Figure 8, it being understood that this lower half of the wedge member 28 has its two side walls 29 and 30 inclined in the same direction as the side walls 26 and 27 of the blade 4 on the two opposite sides of slot 23. The upper portion of the wedge member 28 has a straight side wall 31 above the tongue 29 and a tongue 32 above the straight side wall 30. Moreover, this straight side wall 31 and the side tongue 32 are inclined in a direction opposite to the axial inclination of the lower side walls 29 and 30. Accordingly, the tongue 32 of the wedge 28 engages the undercut angular side wall 25 of the upper blade 3 and the straight side wall 31 engages the straight side wall 24 of blade 3 on the opposite side of the axial slot 22.

With the two blades thus assembled and held against radial displacement an adjusting screw bolt, generally indicated at 33, is inserted to have its inner enlarged circular head 34 rotatable and fit within complementary semicircular transverse slots 35 in the inner opposed surfaces of the two blades 3 and 4. For at least a portion of its length, adjustment screw bolt 33 is provided with external threads 36 to mate with internal threads 37 in the wedge member 28 in such a manner that the smaller outer end of the adjustment bolt 33 extends outwardly toward an aperture 38 in the bar to have its outer end engageable by an adjusting tool.

This may be accomplished by making the adjustment bolt 33 with a hollow angular socket 39 that may be engaged by a plug wrench in order to rotate the adjusting bolt 33 in either direction.

Figures 4, 5:
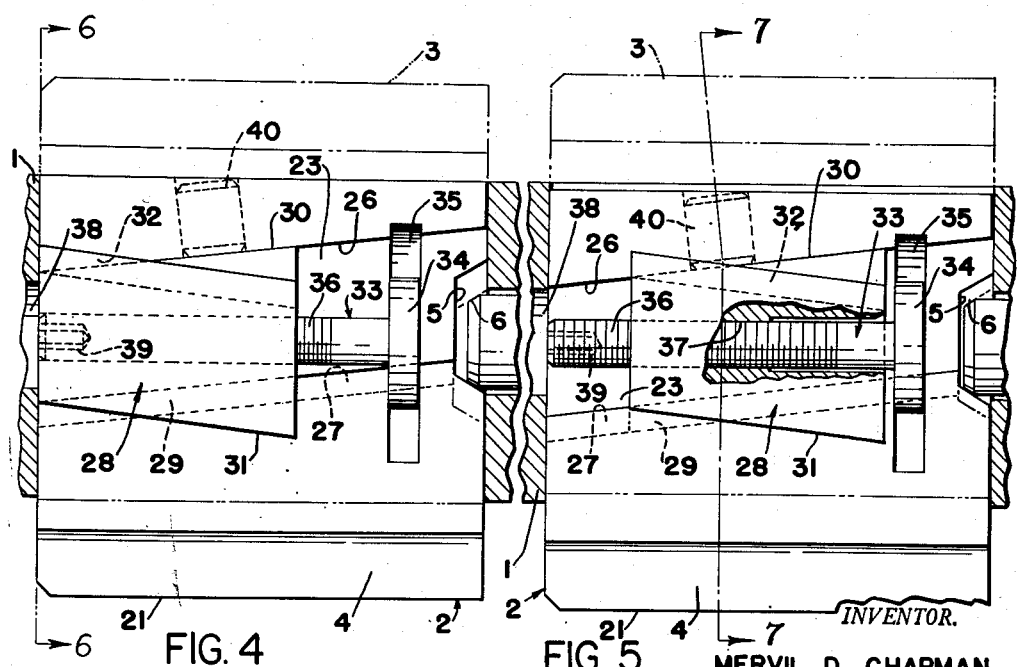
Figure 4 is a fragmentary cross-sectional view of the cutting blade and adjustable wedge assembly for adjusting the blades radially, showing the lower blade and the upper complementary blade being shown in phantom lines superimposed upon the lower blade, the blade adjusting wedge being shown in position to retract the blades to their minimum overall radial adjustment.
Figure 5 is a view similar to Figure 4, showing the blades adjusted radially outwardly to the maximum upon axial adjustment of the blade adjusting wedge.

In Figure 4 I have shown the two blades 3 and 4 to be radially contracted within the bar and in Figure 5 I have shown the two blades 3 and 4 to be radially relatively expanded in the bar so as to have their overall outside diameter increased for cutting a hole of larger size in the work.

In order to lock the two blades either in their relative positions of Figure 4 or Figure 5, or of any intermediate adjustment therebetween, I employ a pair of set screws 40, each with angular plug engageable sockets 41. These two set screws 40 are screwed into screw-threaded holes 42 in the side walls of each blade 3 and 4 opposite their cutting edges 20 and 21, respectively, their hollow angular sockets 41 being engageable by suitable plug wrenches from the exterior of the blade assembly when assembled in the transverse slot of the bar. Moreover, these screw-threaded holes 42 extend through the straight side walls of the two blades 3 and 4 so that the set screws 40 extend therethrough to inpinge upon the straight side walls 30 and 31 of the double acting wedge member 28.

In this manner, a manual rotation of the adjustment screw bolt 33 from the exterior, by a suitable tool, and even while the blade assembly is assembled in the transverse slot of the reamer bar, brings about a positive and controlled radial movement of both blades 3 and 4 to have their two cutting edges 20 and 21 forced uniformly radially outwardly or inwardly in accordance with and in positive response to the direction of manual rotation of the adjustment screw bolt 33. Moreover, when such adjustment has been accomplished and when the blade assembly is still assembled in position in the reamer bar, as shown in Figures 1 to 7 inclusive, external access to both locking set screws 40 is easily had in order to lock both of the blades independently in their thus adjusted positions.

Figure 6 illustrates the working pressures P, $P_1$, $P_2$ and $P_3$. Pressure P represents the pressure of the cut against the cutting edge of one blade 3. Pressure $P_1$ represents the confining pressure against blade 3 as its edge 20 cuts in a hole. This pressure $P_1$ forces the blade 3 against the angular surface of the wedge. Pressure $P_2$ is the resisting pressure of the bar 1 and resists pressure P or the pressure of the cut. The point where pressure $P_2$ is applied is also a fulcrum point for blade 3. Pressure $P_3$ is the resultant pressure of pressure P and pressure $P_1$ acting around the fulcrum point at the location of $P_2$. Because these pressures, as above noted, are shown for one blade only and because there are two blades in the assembly each having like end equal pressures applied to them simultaneously, the blades and wedge become a unit and act as a solid tool.

Thus it will be seen that I have provided a new and novel means for adjusting the two cutting blades radially inwardly and outwardly for outside diameter while they remain assembled in the bar. Moreover, by means of the two direction radially double acting wedge member, this external manual axial adjustment of the wedge positively actuates the two cutting blades radially outwardly or inwardly in accordance with the direction of manual rotation of the wedge actuating bolt. The blades and the wedge member, when assembled, constitute a self-contained unit for insertion in and removal from the reamer bar and for alignment in the bar so as to be floating by means of the resiliently mounted centering pin. Inasmuch as both blades are identical, and the wedge member is symmetrical about its center line, the blade and wedge assembly is self-balanced with respect to weight about its center line.

The blades, when assembled with the wedge, have slots which are at an angle to each other so that movement of the wedge in an axial direction positively causes the blades to move radially inwardly or outwardly to increase or decrease their overall cutting diameter. Inasmuch as the enlarged head of the wedge adjusting bolt fits into identical slots in the blades, there is maintained a definite relationship between the two blades and the adjusting bolt. The wedge, having a threaded hole which mates with the threaded adjusting bolt, may be moved axially by manually rotating the externally accessible adjusting bolt in the desired direction. The two externally assembled locking set screws, one for each blade, provide means for locking the relationship between the blades and the wedge after the desired diametrical setting has been obtained by manual operation of the wedge adjusting bolt.

The blade assembly is mounted for floating movement with relation to the reamer bar which permits the blade assembly to float when it is working in a hole in the work. This occurs when there is a misalignment between a previously drilled hole which is to be finished by reaming and the center line of the reamer bar. There is clearance between the largest diameter of the centering pin and the hole in which it fits so as to permit a side movement, or tilt, of this pin when it is necessary for the blade assembly to float in relationship to the reamer bar. The purpose of the rubber grommet 8 is to create a resistant pressure to the centering pin when it is caused to move or tilt due to the action of the blade assembly while working in a hole. This resistant pressure causes the centering pin to return to center and, in turn, brings the blade assembly back to center when the blades are out of the hole which has caused them to float. This feature is also very desirable for holding the blade assembly on center for applications of this tool to work where it is desirable or necessary to have the tool revolve, that is, as in a drilling machine, boring machine, and the like, before the blades enter the work. Also, because the blade and wedge assembly are symmetrical about their centerline, there is no off-balance condition considering the weight factor. Due to this type of controlled float, namely the returning of blades to center when blade assembly is out of work, this tool will work equally as well on machines where the cutting tools revolve as well as on machines where the cutting tools are non-revolving and the work revolves. The pressure pin, which is adjusted in and out by the conical pointed set screw at its end and locked in place by the set screw against its center angular section, controls the amount of pressure applied against the rubber grommet which, in turn, transmits this pressure to the centering pin so as to result in controlled float. As an alternate design, the centering pin may bear against a centering pocket in the wedge adjusting screw, rather than the centering notches of the blades themselves, so as to obtain the result of controlled float. Also, as an alternate design, I may substitute for the centering pin and rubber grommet a steel ball and a compression coil spring, or leaf spring arranged axially in the axial bore to return the blade assembly to center. The amount of float could be further controlled by limiting the amount of clearance between the centering pin and the hole in which it fits in the bar. The controlled float feature is a self-contained unit designed within the bar and is not a physical part of the blade and wedge assembly, thus making the blade assembly light and free to move as working pressure dictates. This type of blade design makes it feasible to use tungsten carbide type tips and suits the tool to use in smaller holes than do the conventional tools.

I claim:

1. In an adjustable reamer, a bar having a transverse slot near one end thereof and an axial bore extending through the front end of said bar, a pair of blades and a blade holder therefor adapted as a unit to be positioned in said transverse slot in said bar, locking set screws in the side walls of said blades to lock the same against relative movement with said holder, the rear end faces of said cutters being formed with a complementary inclined notch to receive the forward inclined head of a centering pin disposed within the axial bore of said bar behind said cutter blade assembly, said centering pin having a radially reduced shank portion to receive a collar of flexible deformable material between it and said bore to permit floating of said blade assembly but resiliently resist radial displacement thereof in said bar, a pressure pin assembly disposed within the bore behind said centering pin and provided with externally accessible adjustment and locking screws adapted to apply axial force upon said pressure pin to force said centering pin axially forwardly for controlling the position of the centering pin.

2. In an adjustable cutting tool, a bar having a transverse slot near one end thereof and an axial bore extending through the front end of said bar, an integral double acting two-way wedge member, including two superimposed blocks with side surfaces inclined in opposite directions to the axis of the bar, a pair of cutting blades disposed in said slot in diametrically opposite radial directions and each having grooves in their inner surfaces each to slidably fit over one of the two oppositely inclined blocks of said double acting wedge member to be interlocked therewith and relatively slidable axially thereupon, said blade and wedge assembly, as a unit, being adapted to be positioned in said transverse slot in said bar, externally accessible mechanical means carried by said wedge member for positively adjusting said double acting wedge member axially of said bar in either direction for positively adjusting said two blades uniformly radially inwardly or outwardly by the axial movement of said wedge member while said wedge member and blades are in said bar.

3. In an adjustable cutting tool, a bar having a transverse slot near one end thereof and an axial bore extending through the front end of said bar, an integral double acting two-way wedge member including two superimposed blocks with side surfaces inclined in opposite directions to the axis of the bar, a pair of cutting blades disposed in said slot in diametrically opposite radial directions and each having grooves in their inner surfaces each to slidably fit over one of the two oppositely inclined blocks of said double acting wedge member to be interlocked therewith and relatively slidable axially thereupon, said blade and wedge assembly as a unit being adapted to be positioned in said transverse slot in said bar, externally accessible mechanical means carried by said wedge member for positively adjusting said double acting wedge member axially of said bar in either direction for positively adjusting said two blades uniformly radially inwardly or outwardly by the axial movement of said wedge member while said wedge member and blades are in said bar, externally accessible mechanical locking means in the side walls of said cutters to lock the same against relative movement with said double acting wedge member while said wedge member and said blades are in said bar.

4. In an adjustable cutting tool, a bar having a transverse slot near one end thereof and an axial bore extending through the front end of said bar, an integral double acting two-way wedge member, including two superimposed blocks having side walls oppositely inclined to the axis of the bar, a pair of cutting blades disposed in said slot in diametrically opposite radial directions and having grooves in their inner surfaces each to slidably fit over the side walls of one of the two oppositely inclined blocks of said double acting wedge member to be interlocked therewith relatively slidable axially thereupon, said blade and wedge assembly, as a unit, being adapted to be positioned in said tranverse slot in said bar, externally accessible mechanical means carried by said wedge member for positively adjusting said double acting wedge member axially for positively adjusting said two blades uniformly radially inwardly or outwardly while said wedge member and blades are in said bar, externally accessible mechanical locking means in the side walls of said cutters to lock the same against relative movement with said double acting wedge member while said wedge member and said blades are in said bar, the rear end faces of said cutting blades being formed with a complementary notch to receive the forward head of a centering pin disposed within the axial bore of said bar behind said cutting blade assembly, said centering pin having a radially reduced shank portion to receive a collar of flexible deformable material between it and said bore to permit floating of said cutting blade assembly but resiliently resist radial displacement thereof in said bar, a pressure pin assembly disposed within the bore behind said centering pin and provided with externally accessible locking screws extending angularly against said pressure pin assembly and adapted to apply axially force upon said pressure pin to force said centering pin axially forwardly for controlling the position of the centering pin.

5. In an adjustable cutting tool, a bar having a transverse slot near one end thereof and an axial bore extending through the front end of said bar, an integral double acting two-way wedge member including two superimposed blocks with side walls and locking side tongues, one locking side tongue being disposed adjacent one side wall and inclined in opposite directions to the axis of said bar and the other locking side tongue being adjacent the other side wall and being also inclined in opposite directions to the axis of said bar, a pair of cutting blades disposed in said slot in diametrically opposite radial directions and having their inner surfaces undercut to slidably fit over the two complementary inclined wedge surfaces of said double acting wedge member to be relatively slidable axially thereupon and interlocked therewith, said blade and wedge assembly, as a unit, being adapted to be positioned in said transverse slot in said bar, an externally accessible externally screw-threaded bolt adapted to extend axially through said double acting wedge member and in screw-threaded engagement therewith and provided with an enlarged inner head that is rotatably mounted in complementary semi-circular slots disposed transversely of the inner surfaces of said two cutting blades so that external manually applied rotative force on said bolt positively causes axial movement of said wedge member and relative motion between said two blades and said double acting wedge member and positively causes said two blades to be uniformly displaced radially inwardly or outwardly in accordance with the direction of rotation of said bolt, all while said wedge member and blades are assembled in said bar.

6. In an adjustable cutting tool, a bar having a transverse slot near one end thereof and an axial bore extending through the front end of said bar, an axial double acting two-way wedge member including two superimposed blocks with side walls and locking side tongues, one locking side tongue being disposed adjacent one side wall and inclined in opposite directions to the axis of the bar and the other locking side tongue being adjacent the other side wall and being also inclined in opposite to the axis of the bar, a pair of cutting blades disposed in said slot in diametrically opposite radial directions and having their inner surfaces undercut to slidably fit over the two complementary inclined wedge surfaces of said double acting wedge member to be relatively slidable axially thereupon and interlocked therewith/said blade and wedge assembly, as a unit, being adapted to be positioned in said transverse slot in said bar, an externally accessible externally screw-threaded bolt adapted to extend axially through said double acting wedge member and in screw-threaded engagement therewith and provided with an enlarged inner head that is rotatably mounted in complementary semi-circular slots disposed transversely of the inner surfaces of said two cutting blades so that external manually applied rotative force on said bolt positively causes axial movement of said wedge member and relative motion between said two blades and said double acting wedge member and positively causes said two blades to be uniformly displaced radially inwardly or outwardly in accordance with the direction of rotation of said bolt, externally accessible locking set screws in the side walls of said cutting blades to lock the same against relative movement with said double acting wedge member after adjustment by said bolt, all while said wedge member and blades are assembled in said bar.

References Cited in the file of this patent

UNITED STATES PATENTS

| Number | Name | Date |
|---|---|---|
| 1,033,998 | Dugan | July 30, 1912 |
| 1,290,206 | Howk | Jan. 7, 1919 |
| 1,473,781 | Davie | Nov. 13, 1923 |
| 2,371,127 | Calhoun | Mar. 13, 1945 |
| 2,408,891 | Steiner | Oct. 8, 1946 |